April 27, 1965 N. F. BOUNSALL 3,180,930

EDITING CONTROL SYSTEM FOR TELEVISION PROGRAM RECORDER

Filed Oct. 2, 1961 4 Sheets-Sheet 1

NORMAN F. BOUNSALL
INVENTOR.

BY Nathan N. Kallman

ATTORNEY

EDITING CONTROL SYSTEM FOR TELEVISION PROGRAM RECORDER

Filed Oct. 2, 1961 4 Sheets-Sheet 2

NORMAN F. BOUNSALL
INVENTOR.

BY Nathan N. Kallman

ATTORNEY

NORMAN F. BOUNSALL
INVENTOR.

BY Nathan N. Kallman

ATTORNEY

NORMAN F. BOUNSALL
INVENTOR.

BY Nathan N. Kallman

ATTORNEY

United States Patent Office 3,180,930

Patented Apr. 27, 1965

3,180,930
EDITING CONTROL SYSTEM FOR TELEVISION PROGRAM RECORDER

Norman F. Bounsall, Palo Alto, Calif., assignor to Ampex Corporation, Redwood City, Calif., a corporation of California Filed Oct. 2, 1961, Ser. No. 142,328
19 Claims. (Cl. 178—6.6)

This invention relates to systems for sequentially recording and organizing information, and particularly to systems for recording and revising television program material recorded on magnetic tape.

Wideband magnetic recording and reproducing systems are extensively used for storing and processing television program material, instrumentation data and the like. Typically, such systems operate substantially continuously in recording data from different sources, such as any of a number of cameras or other recording systems. The systems must operate at high speed and the recordings must have extremely high density. Although these requirements are readily satisfied under conditions of continuous operation, they are much more difficult to obtain under conditions of intermittent or irregular operation. A high speed system cannot be stopped or started instantaneously, so considerable time and a considerable length of tape must be utilized in bringing a selected position on the tape to the standard recording speed. For these and other reasons it is very difficult to identify desired change points in the program material, and to add, delete or revise the program material at the change points. Consequently, it has been necessary to effect these changes by manual positioning, cutting or splicing of previously recorded lengths of tape. When short segments of program material must be handled in this manner, a great deal of time is required to edit a complete program. In addition, there is considerable wastage of tape and often breakage of the tape at the splicing points.

It should specifically be borne in mind that revisions, deletions or additions to previously recorded information are often desirable with instrumentation recording systems and with other types of data processing systems. When a large number of individual relatively brief tests are to be conducted, and selected parameters measured during each of the tests, the data which is acquired should preferably be recorded in a continuous sequence. Most present systems introduce blank spaces of considerable length between the successive recordings because they cannot shut down or start the tape recorder mechanism without considerable delay. The need for revising and rearranging recorded sequences, however, is most commonly found in the preparation of television program material. In assembling such material into a form suitable for broadcast, a program director views previously recorded program segments and selects the order in which the segments will be presented and the points at which changes will be made from the one segment to another and at which further additions will be inserted. It is clearly impractical for a program director to rely on random markings on the tape to designate change points, and it is difficult to use cueing marks on the tape, although such a system is far preferable to random guessing as to where splices should be taken. It is most desirable for the program director and others in charge of the preparation of material to be able to control the selection of change points and the reorganization of material automatically through electronic means.

The most widely used television recording system utilizes a relatively wide tape and a rotating head drum which records the television signals in tracks which are at least partially transverse to the tape. Such systems provide high head-to-tape speed and wideband recording, and additionally are capable of achieving a high order of time base stability. With such systems, one or a number of the transverse tracks are devoted to each television frame. At the same time longitudinal tracks along the edges of the tape are available for audio signals and control purposes.

Control systems in accordance with the present invention are therefore concerned with the problems of editing and cueing changes in recorded material. The systems are not solely concerned with the identification and use of change points at which one segment of recorded program material is to be substituted for another. An automatic editing and cueing system should be able, for example, to enable a program editor to "rehearse" a proposed presentation by permitting him to play back the material in such a fashion that he can review the segments and note the effects of the changes he has made. Another effect which is often useful is that of "animation," in which successive individual frames, or short sequences of frames, are exposed to different presentations to give the effect of motion, as is commonly done in the preparation of movie cartoons. This requires that any frame or selected series of frames be added directly to previously recorded frames, and in synchronism therewith. A similar requirement is imposed when it is desired to use time lapse effects, in which successive individual frames or sequences of frames are recorded after the lapse of a predetermined delay following the last previously recorded frame. Heretofore, animation and time lapse effects have been achieved only by using other types of recording systems as an intermediate storage, or by using very complex processing procedures in order to eliminate discontinuities in the recordings.

At all times, the recorded material must be referenced to and in synchronism with the vertical synchronizing signals in the recorded program material. Some television recorders are designed so that they may use the studio synchronizing signal as a time base reference, and are servoed to seek and maintain a minimum error from this reference signal. Another recording system, however, utilizes a time control signal which is recorded during the recordation of the program material and which, on reproduction, provides a continuous measure of the time base error from which corrections may be made. The later type of system maintains a high order of time base stability but does not hold a precise relation to the studio synchronizing signal. It is extremely desirable that the signal which is processed for broadcast be closely synchronized to this reference in order that the quality of the broadcast picture may be improved.

It is therefore an object of the present invention to provide improved systems for editing and revising segments of material recorded on magnetic tape.

Another object of the present invention is to provide improved control systems for operating magnetic recording and reproducing systems so as to provide rehearsal, cue and other capabilities.

Another object of the present invention is to provide an improved control system for television program recorders, to permit the recorders to be operated so as to provide animation and time lapse effects.

Yet another object of the present invention is to provide an improved control for television recording and reproducing systems, to enable such systems to operate in synchronism with a signal reference.

Systems in accordance with the present invention greatly enhance the versatility of magnetic tape recording and reproducing systems by making them capable of performing automatically the functions of revising, deleting and adding program material. With a television recording system, for example, separate edit signals are recorded to denote each television frame, and cueing signals may also be recorded to denote separate change points as these points are selected for revision of program material. The cueing signals which correspond to change points may then be used to control the entry of new recordings under control of a separate editor unit which insures that the changeover is made without losing synchronization. Alternatively, the cueing signals may be used to initiate and control operation of an animator unit by which animation and time lapse effects may be achieved. A feature of the invention is the employment of settable counter means and a circuit for detecting the last previous recorded television frame because of the absence of the cueing pulses denoting the start of each frame. The animator unit operates the recording and reproducing system in a controlled cycle to record one or a selected number of frames directly following previous recorded frames and to then rewind and stop the recording system at a point at which the next following frame may be recorded with minimum of delay. The animator unit may be caused to operate periodically, with selected intermediate delays, in order to provide time lapse effects.

Another feature of systems in accordance with the invention is the provision of an arrangement for maintaining synchronism with the studio synchronizing signals which are provided as a reference. Signals derived from the timing track of a tape are compared in phase to the studio synchronizing signals, and an error signal is generated which is useful in controlling the drive capstan of the tape system so as to establish and maintain frame by frame synchronization with the reference signal from the studio.

A better understanding of the invention may be had by reference to the following description, taken in conjunction with the accompanying drawings, in which:

FIGURE 1, consisting of FIGURES 1(A) and 1(B) on separate sheets is a block diagram and simplified perspective view of the principal elements of a television recording system in accordance with the invention, which system includes a cueing unit, an animator unit, and a synchronization control system;

Figure 1A:
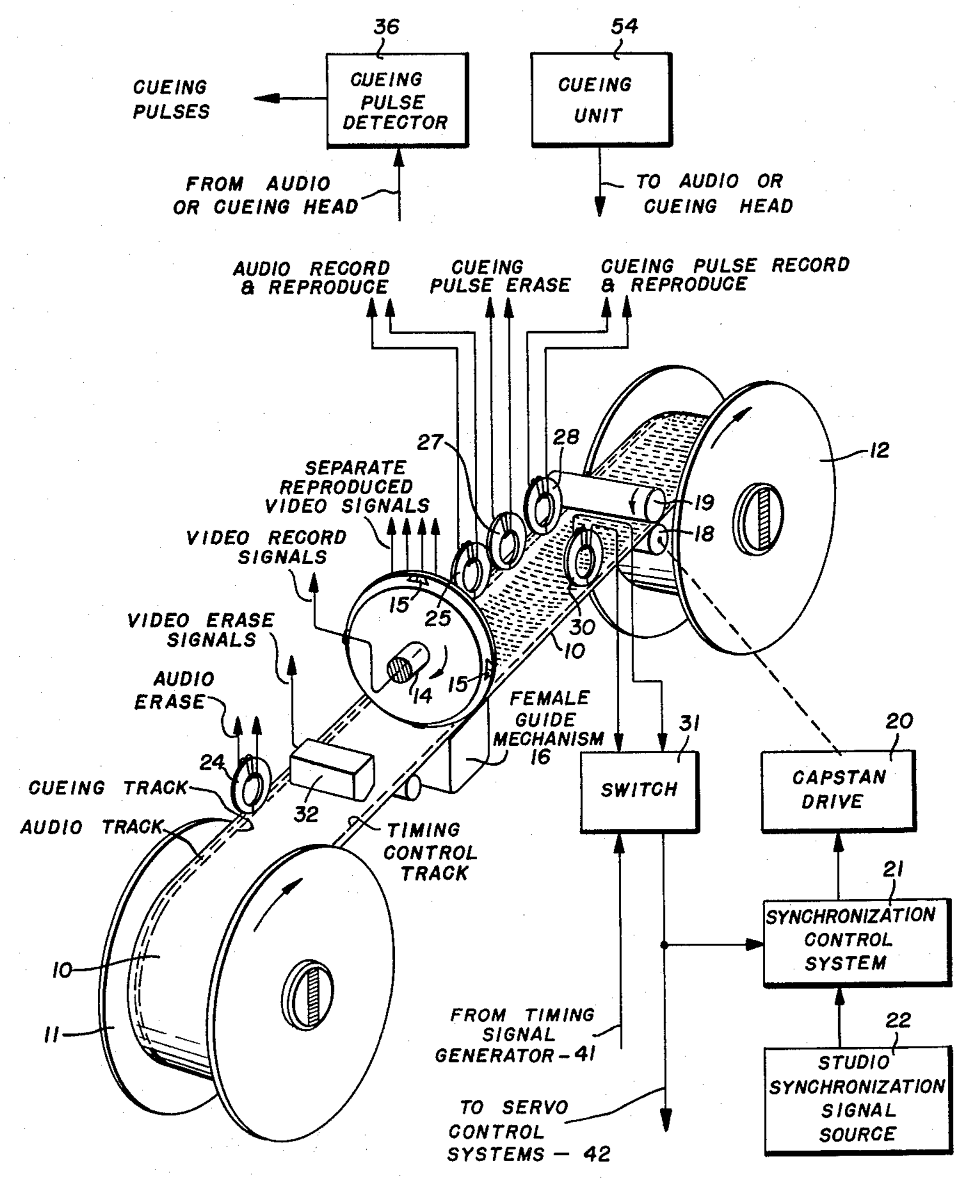
Figure 1B:
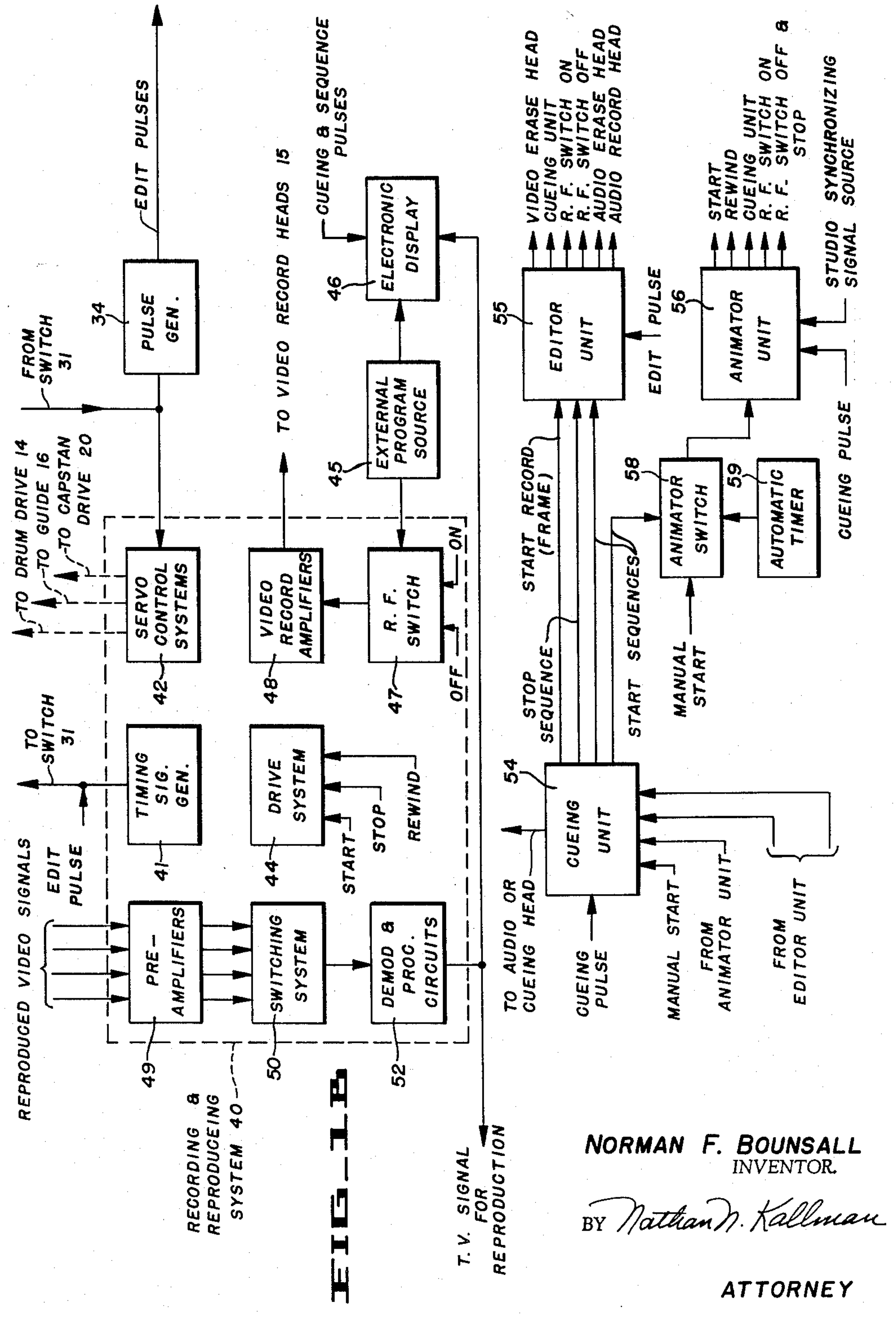

The principal elements of a wideband magnetic tape recording and reproducing system which has great versatility in automatic revision, editing and control of the entry of data are shown in the separate view of FIGURES 1(A) and 1(B) which together constitute FIGURE 1. The particular example which is given is concerned with the recording of television program information, and with the control of the system to achieve various editing and other effects. Although the example which is given is concerned with the transverse track type of magnetic tape system using a number of magnetic heads positioned in a rotating head drum to achieve transverse track recording (this being the most widely used system) it will be appreciated that the invention is not limited thereto but may be applied as well to longitudinal recording systems, or to systems using other rotating head arrangements.

In this type of television recording and reproducing system a relatively wide tape 10 is fed past an operating zone from a supply reel 11 to a takeup reel 12. At an intermediate point in the operating zone signal recording and reproduction are effected as the tape 10 moves past a head drum and timing wheel 14. The drives for the reels 11, 12 and for the head drum and timing wheel 14 have not been shown in order to simplify the representation, inasmuch as reference may be made to widely published literature for an understanding of these details. Similarly, the details of the head drum and timing wheel 14, and the manner in which electrical connections are made to the head drum have not been shown. It is sufficient to state that each of four video record heads 15 which are symmetrically placed about the head drum 14 are energized from a common signal source during recording. These heads 15 provide separate signals which are combined by a switching system when the system is operated in the reproduce mode. It is also known to utilize two sets of heads, one each for the record and reproduce mode, but this expedient does not affect the operation of systems in accordance with the invention. The wide tape 10 is cupped about the head drum 14 by a female guide mechanism 16 using an internal suction mechanism to hold the tape 10 in contact with the rotating heads 15. The tape 10 is driven at a controllable longitudinal rate by a capstan 18 which urges the tape 10 against a pinch roller 19.

In the record mode, the capstan 18 is driven at a substantially constant rate of speed by the associated capstan drive 20. In the reproduce mode, however, it is desired and indeed necessary to compensate for the minor variations in longitudinal tape movement which occurred during recording, and this is accomplished in part by varying the capstan drive speed in accordance with some reference. Although this reference may be derived from the synchronizing signals contained within the composite television signal itself, many systems such as the system illustrated in FIGURE 1 utilize a timing control track on which a composite timing signal is recorded to represent timing wheel speed variations. Reproduced timing control signals are utilized to generate an error signal for precisely controlling the capstan drive 20. Usually, the timing control signals are not directly related to any external time base, so that there may be loss of synchronization on switching between different signal sources. One feature of systems in accordance with the present invention is the employment of a synchronization control system 21 that is coupled to receive signals from the studio synchronizing signal source 22, which constitutes the "studio sync" or highly stable time reference, such as is available in broadcast studios.

Audio program information is recorded on a selected longitudinal track which extends along one edge of the tape 10 adjacent to, but spaced from, the area in which the television signals are recorded. Along this track are positioned an audio erase head 24 and an audio record and reproduce head 25. A separate longitudinal track is available for recording and reproducing cueing pulses which may either be randomly related in time to the television signals, or recorded and reproduced coincidently with each vertical synchronizing pulse, to denote successive television frames. A cueing erase head 27 and a cueing record and reproduce head are spaced apart along this separate longitudinal track. Although a number of other longitudinal tracks may be employed, only the additional timing control track is shown here. A timing signal record and reproduce head 30 is associated with this track, the erase head which may be used being omitted for clarity. Signals to be recorded are applied through a switch 31 to be timing signal head 30, and the switch 31 also couples signals which are reproduced by the head 30 to the synchronization control system 21 as well as to various servo control systems within the recording and reproducing system as a whole. The central part of the tape 10, on which the transverse tracks containing television signals are recorded, is erased prior to recording by a video erase head 32.

Cueing pulses are recorded to designate arbitrarily selected change points in the program material. In viewing a program, the program editor may operate a control switch or button at a start time and at a stop time for a given segment of program material. Alternatively these signals may come from the animator or editor units described below. A pulse signal is generated for each actuation and may be applied to either the audio record head 25 or the cueing pulse head 28. Although the cueing pulse head 28 is used in this example, it is also convenient to use the audio head 25. For example, the head 25 may record a supersonic pulse signal which is non-audible but which may be filtered, or a pulse which may be clipped. Supersonic pulse signals may be provided, for example, by using a single pulse generator actuated by the switch which the program editor has access to, to control the time and duration of operation of an oscillator which provides signals at the desired frequency. The supersonic signals may then be superimposed at any desired points over the audio signals previously or concurrently recorded on the audio track.

The cueing pulses, which designate change points in the program material, are to be distinguished from the edit pulses which are used within the system for other purposes. These edit pulses are recorded or generated separately. They may be recorded along with the timing sine waves, as pulses of a selected higher amplitude on the timing control track, by selectively extracting one vertical synchronizing pulse from the studio synchronizing signal to identify a specific point at the start of each television frame.

The edit pulses may then be regenerated through use of an amplitude responsive pulse generator 34 during reproduction of signals. The cueing pulses are reproduced from the audio program material or the cueing track by a cueing pulse detector 36. The term "pulse detector" in this instance refers to any suitable amplifying, filtering and pulse generating circuit, for the signal derived from the tape. With supersonic signals from the audio track the detector may take the form of a bandpass filter which is responsive to the selected supersonic frequency, an envelope detector, and a one-shot multivibrator which is responsive to pulse signal waveforms generated by the envelope detector.

The recording and reproducing system 40 which operates conjointly with the tape transport and various transducers previously described need only be referred to herein in general terms, and specific interrelationships between the circuits of the system and the previously described elements will be understood to be present, even though not shown in detail. The recording and reproducing system 40 as a whole includes a timing signal generator 41 which is responsive to signals generated as the timing wheel rotates and which is coupled to record on the timing control track. Various servo control systems 42 are utilized within the system 40, in order to control the drive for the head drum and timing wheel 14, the capstan 18, and the female guide mechanism 16. As is now well understood in the art, the various corrections which may be made by these servo control systems insure a high order of time base stability, by compensating for variations in the speed of operation of the head drum and timing wheel 14, the longitudinal speed of the tape 10, and the dimensional stretching of the tape 10 in the transverse direction, among other things. Although this particular widely used transverse track system has been described by way of example, a number of particular time base correction techniques have been adopted for various applications. As mentioned above, certain of these techniques use different timing reference signals, and it should also be noted that other techniques employ electronic correction of the time base. An important aspect of the present invention is the fact that deletion, editing and revision may be effected by control systems in accordance with the invention no matter which individual or combined time base correction systems are employed.

It will be evident to those skilled in the art that the the tape transport system of a wideband recording and reproducing system involves considerable inertia and that complicated and expensive compliance mechanisms which are used to attain extremely fast start and stop times are not feasible with such systems. Even at their best, fast acting systems of this kind are not capable of usefully employing the very brief retrace intervals which are present in the composite television signal. Accordingly, in order to prevent loss of synchronization in the television signals, the system must take into account the times required for the machine to come to a full stop after the signals have been terminated, and for the machine to come to normal operating speed after having initially been started. This is a function principally of the drive system 44 for the tape transport. Although this drive system 44 is not shown in detail, approximately 5 seconds may be needed before normal operating speed is attained from a full stop, and approximately 1 second before a full stop can be made from normal speed. The drive system 44 accordingly includes provision for receiving start and stop signals, and a rewind signal, under the control of which the tape 10 may be driven in the reverse direction at high speed. The head mechanism may be constructed such that the heads are held out of contact with the tape during the rewind interval. Also, the tape may be lubricated before passing the head during these repeated cycles, and the lubricant (sperm oil or the like) removed by a compressive pad prior to the capstan.

The signals which are to be recorded are derived from an external program source 45, which in the usual studio consists of a number of individual television cameras, other television recording and reproducing systems, and various test signal sources. The studio equipment also includes what may be termed an electronics display 46, which is responsive to signals from the external program source 45, to cueing pulses and to signals reproduced by the magnetic tape system described herein. By use of the switching conventionally available in the studio, the program director may view either the signal from the external program source 45 or the signal being reproduced by the present system. Alternatively, after a number of change points for the program material have been selected, the desired revisions may be "rehearsed one or many times by using cueing pulses to effect switching so as to provide a representation of how the selected program segments will appear when presented in the desired sequence.

When transverse track recording and reproducing systems of this type are operated in the record mode, signals derived from the external program source 45 are applied through an RF switch 47 which couples program signals through video record amplifiers 48 to the video record heads 15 on the head drum 14. The RF switch 47 is arranged and controlled so as to be bistable, and when actuated remains On until an Off pulse is applied. When the system is operated in the reproduce mode, the signals derived in the separate channels from each of the heads are coupled through separate preamplifiers 49 to a switching system 50 which is operated in synchronism with the signals generated from the timing wheel mechanism. The switching is effected so that the signals from the separate heads are smoothly blended to reconstitute the originally recorded composite television signal, as the various time base corrections are made in a complementary fashion to achieve a high order of time base stability. Signals derived from the switching system 50 are applied through demodulator and processing circuits 52 and provide the television signal suitable for reproduction or broadcast as well as the electronics display 46. The elements of the recording and reproducing system 40 which are shown in FIGURE 1 will be understood to have been greatly simplified in order to clarify the description of the invention.

Figure 2:
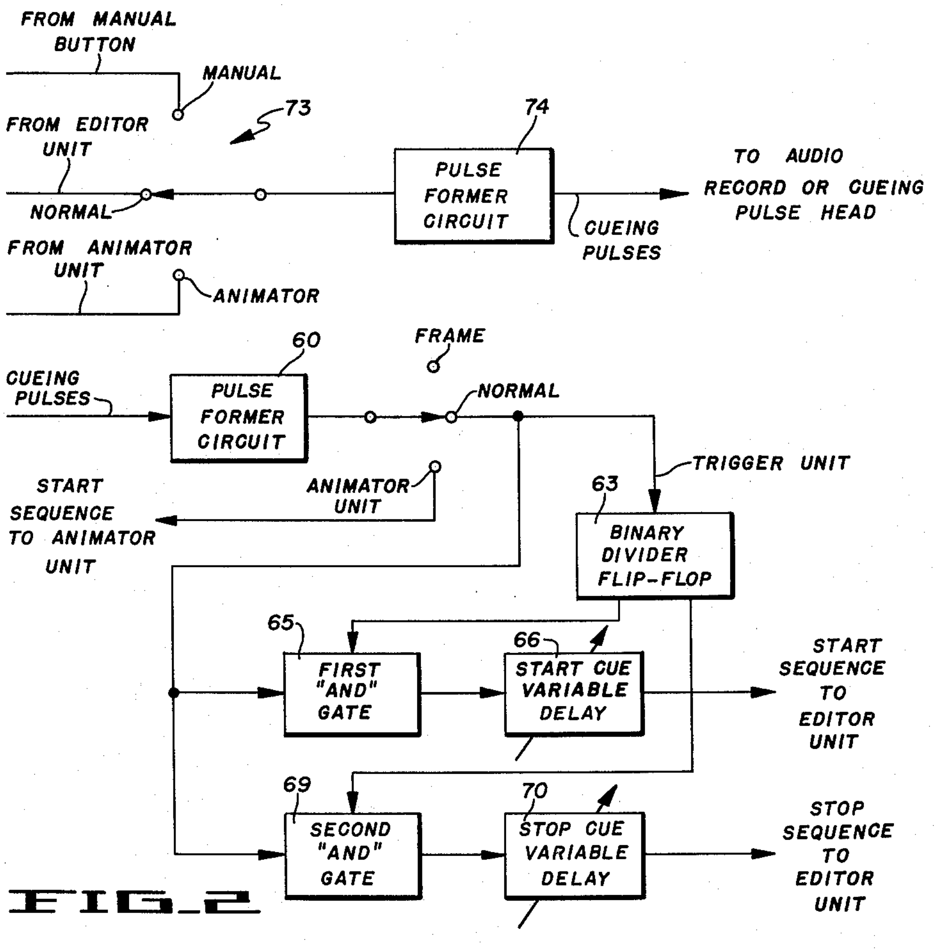
FIGURE 2 is a block diagram representation of a cueing unit which may be employed in the arrangement of FIGURE 1, in accordance with the invention.
Figure 4:
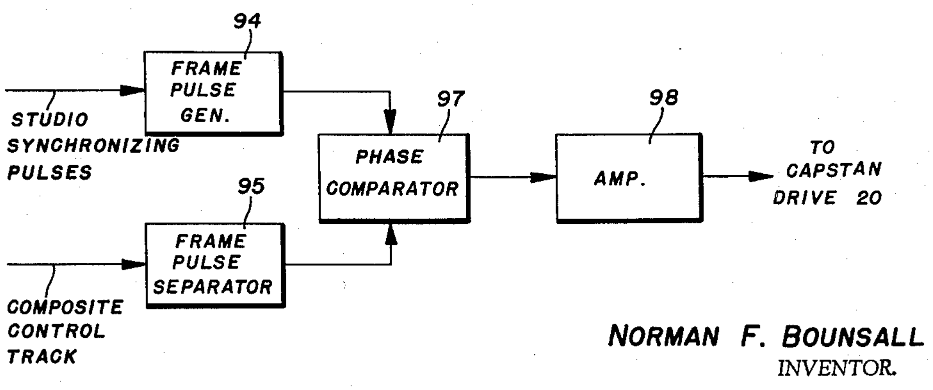
FIGURE 4 is a block diagram of a synchronization control system which may be employed in accordance with the invention.
Figure 3:
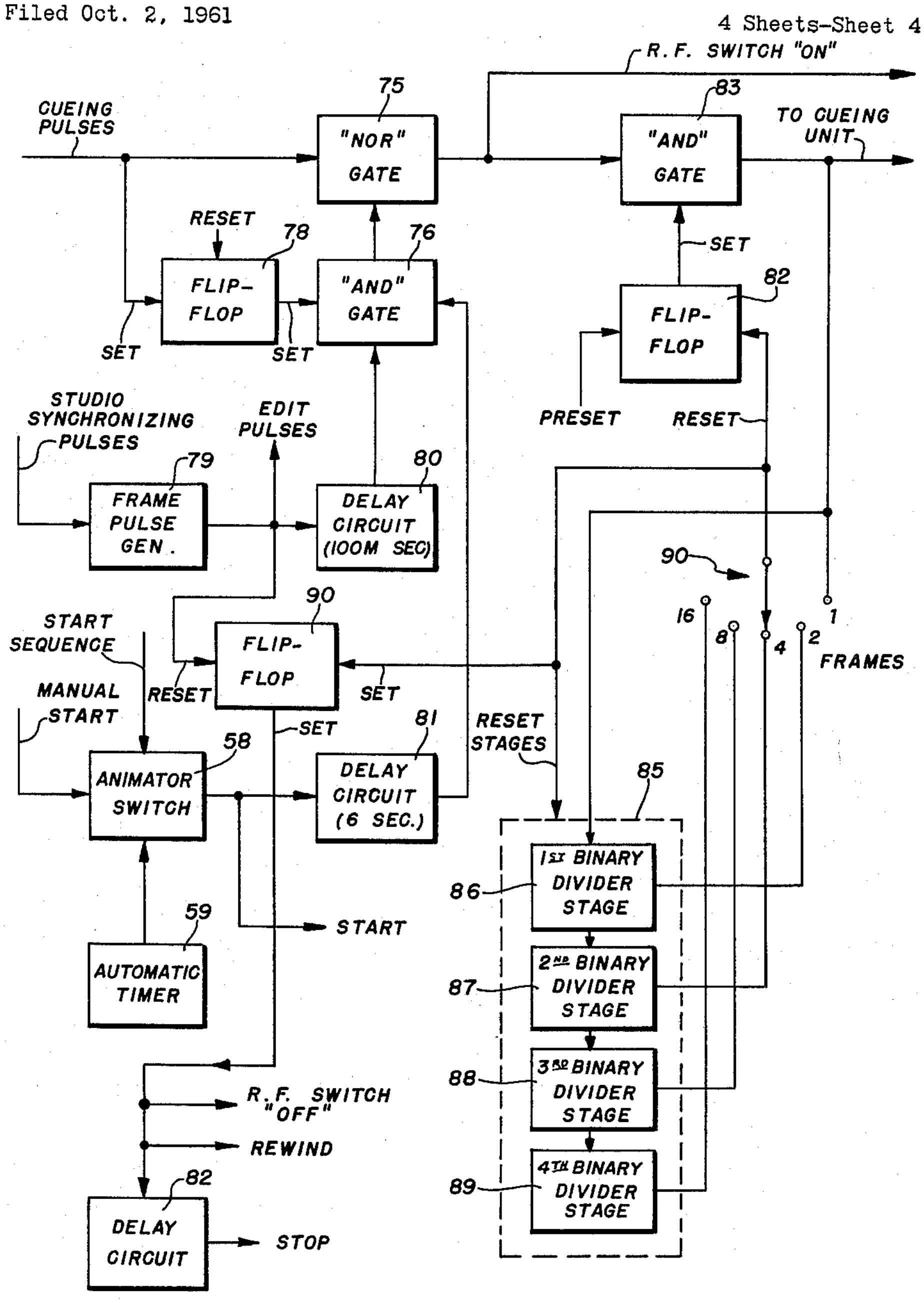
FIGURE 3 is a block diagram of one form of animator unit which may be employed in the arrangement of FIGURE 1.

The majority of units used in control systems for program recorders in accordance with the invention are those described hereafter and in detail in conjunction with FIGURES 2, 3 and 4. Operation of these units may begin in a number of different ways, one of which is by the application of cueing pulses to a cueing unit 54. The cueing pulses are most typically derived from the cueing pulse detector 36, during operation in the reproduce mode, the pulses previously having been recorded by manual selection or under control of one of the other units. The two principal components employed in the system which cooperate with the cueing unit 54 to provide selectable timed control cycles are an editor unit 55 and an animator unit 56. Although a detailed description of the functioning of these various units is given below, the coaction of the different units in the overall system, and their interrelationship with each other, may conveniently be stated here in conjunction with FIGURE 1. The editor unit 55 is more completely described in my copending application for patent, entitled "Editing Systems for Television Recordings," filed October 2, 1961, Serial No. 142,332 (now U.S. Patent No. 3,084,215) and assigned to the assignee of the present invention.

The cueing unit 54 utilizes the cueing pulses, from whatever source received, to initiate any of a number of different cycles, in each of which certain signals are provided. Appropriate switching means are provided within the cueing unit 54 for the selection of these cycles. The editor unit 55, in a broad sense, controls the function of substituting or adding new program material, beginning and ending with selected change points in the program material. These change points, of course, are designated by the cueing pulses which are applied to the cueing unit 54. The cueing pulses need not, however, be in synchronism with or in any specific timed relation to the frames of television program material which are recorded on the tape. The editor unit 55, as described in my copending application, utilizes these pulses which are derived from the cueing unit 55 to start and stop the substitution of new material in the program material, in a controlled cycle in which video erasure begins at the point selected for the start of subsequent video recording. Furthermore, the editor unit 55 initiates the video recording so that new frames are recorded in synchronism with the previous frames. In the usual editing cycle, the cueing unit 54 provides a start sequence pulse and a stop sequence pulse to the editor unit 55.

The start sequence pulses may also be applied to the animator unit 56 through an animator switch 58. The animator unit 56 governs the system as it proceeds through a timed cycle, in which one or a desired number of frames is recorded on the tape, following which the system is stopped, rewound back to a point at which recording of material contiguous to the previous material may again commence with a minimum of time delay, and then stopped again. The animator unit 56 may also be operated, through the animator switch 58, by a manual start control, or an automatic timer 59. The automatic timer 59 may be used to provide time lapse effects, by controlling the cyclic operation of the animator unit 56 in such fashion that successive individual frames, or series of frames, are recorded with a selected time lapse between each successive recording.

The editor unit 55 and the animator unit 56 also provide pulses which are coupled through the cueing unit 54 for use in the recording of new cueing pulses. Alternatively, these pulses may be provided from a manual start source. Except for the fact that the manual start pulses may be applied at any time, in either the record or reproduce modes, the pulses are applied to the cueing unit 54 when the system is operating in the reproduce mode. Once started, the animation and time lapse cycles are completely controlled without externally applied or derived cueing pulses.

A detailed example of a cueing unit 54 for performing the functions above mentioned in conjunction with FIGURE 1 is shown in FIGURE 2. When operating in the reproduce mode, cueing pulses are applied to a pulse former or shaper circuit 60 which is coupled to a single pole, two position switch 62. In one position of the switch 62, designated "Normal," alternate pulses from the pulse former circuit 60 are used as start sequence and stop sequence pulses for the editor unit 55.

In generating these start and stop sequence pulses, the cueing signals are applied to a binary divider flip-flop 63 which is coupled to control passage of the signals themselves alternately through separate channels. The signals are applied to the trigger input of the binary divider flip-flop 63, to reverse the state of the flip-flop 63 after each pulse is applied. Concurrently, the output signals from one terminal of the binary divider flip-flop 63 are used to condition a first AND or coincidence gate 65 to which the pulses from the pulse former circuit 60 are also applied. As long as the binary divider flip-flop 63 is in a state in which the output signal at the terminal coupled to the first AND gate 65 is "high," the pulse from the pulse former circuit 60 is passed through the first AND gate 65, prior to the reversal of the flip-flop. The pulse is then passed through a start cue variable delay circuit 66 to be applied as a start sequence pulse for the editor unit.

Likewise, when the binary divider flip-flop 63 is in the opposite state, the other output terminal from the flip-flop is coupled to condition the second AND gate 69 for input impulses from the pulse former circuit 60. When in this state, these pulses are passed through the second AND gate 69 and a stop cue variable delay circuit 70 to constitute the stop sequence pulses for the editor unit. Both the start sequence and stop sequence pulses for the editor unit control the generation of timed cycles by which recording is either initiated or terminated, with consequent editing of program material.

The variable delays 66 provide a useful feature of the system. Once having selected the change points, the program editor may operate the electronics display 46 in the "Rehearse" mode, using the sequence signals to control switching without actually revising the recorded program material. This may be repeated as many times as desired. Often, on rehearsal, the change points will not be precisely where desired. By adjusting the variable delays 66, 70, however, the change points may be shifted precisely without requiring repetition or erasure. This affords the program editor added flexibility and control.

Additionally, it should be noted that as long as start and stop signals are alternated there can be a succession of changes in the recorded material. New time segments of program material can be substituted for precisely selected segments of an existing recording in an unbroken sequence.

In a second position of the switch 62, designated "Animator unit" the cueing pulses are passed directly as start sequence pulses to the animator unit, which thereafter governs the system in the performance of the predetermined cycle and terminates the sequence automatically.

Cueing pulses are recorded under control of the cueing unit 54, in response to any of a number of sources. Three different sources are shown, each of which is coupled to a different contact point of a single pole, three position switch 73. The cueing pulses are shaped by a pulse former circuit 74 which is coupled, in the record mode, to an audio record or cueing pulse head in the system of FIGURE 1. In a first position of the switch 73; that position designated "Manual," the signals are those provided by the program editor or other operator at his option, and occur in random time relation to the recorded frames on the program material. In a second position, designated "Normal," the cueing pulses are provided by the editor unit. These pulses correspond to the signals used within the editor unit to terminate the recording function, and so identify the end of the last previously recorded frame, and in another sense the start point for the next frame which is to follow. In the last position of the switch 73, designated "Animator," the cueing pulses are derived from the signals provided from the animator unit as it carries out its control function during recording of a single frame, or a selected number of frames.

A specific example of the arrangement and operation of an editor unit suitable for use in this system is described in my copending application for patent which is referred to above. Inasmuch as reference may be made to this application for a complete understanding of the editor unit, only certain functions and characteristics of the unit need be described here in detail. In normal operation, gating and cycle control circuits within the editor unit are operated in timed relation to recorded television frames, as represented by the edit pulses provided concurrently with the start of each frame. These pulses are made substantially coincident with a selected vertical synchronizing pulse in the series of vertical synchronizing pulses provided in the flyback interval as the program material is reproduced. The bistable device associated with the RF switch 47 (FIGURE 1) turns the video portion of the switch On and Off and directly controls the television recording. Video erase, audio erase and audio record heads are energized and de-energized in timed relation to the recording of the television signal such that synchronism with previously recorded material is maintained. Inasmuch as the editor unit operates to substitute one segment of the program material for the other, or to add segments starting with a change point, the edit pulses which control the recording of the new material may also be returned to the system. Thus there is continuity in the series of edit pulses. Alternatively, of course, these pulses need not be erased from the tape in this operation. In summary, therefore, the start sequence and stop sequence pulses which are applied to the editor unit 55 during normal operation are put in synchronism with edit pulses which are derived from the tape system, and the coupling from the bistable device which controls the RF switch is energized ("ON") and de-energized at selected synchronous times.

The signal which controls the bistable device to de-energize the RF switch identifies the end of the last recorded frame which is to be inserted. This signal therefore constitutes a cueing pulse, and is the signal which is coupled back to the cueing unit 54.

An example of an animator unit 56 suitable for performing the mentioned functions which operates in integrated fashion with the recording and reproducing system and the cueing unit is shown in FIGURE 3. The cueing signals which are derived from the cueing pulse detector 36 (FIGURE 1), the studio synchronizing pulses and the start pulses (derived either manually, from the start sequence pulses, or from the automatic timer 59) are used together to initiate recording in synchronism with and at the end of the previously recorded material. Animation and time lapse sequences are fully controlled, and use two operative features. Lengths of tape on which sequences are to be added are pre-demagnetized, and a cueing pulse is provided at the start of each television frame.

The cueing pulses are applied to one input terminal of a NOR gate 75, which tests for the concurrent existence of edit pulses derived from and AND gate 76. The latter gate 76 is a three input terminal gate having one input terminal coupled to a flip-flop 78 which is energized by the cueing pulses. The flip-flop 78 is preset by a "Play" or other initiating signal, and then is set by the first cueing pulse, so that the AND gate 76 is disabled until cueing pulses are provided. This prevents edit pulses, derived from the composite studio synchronizing signal by a frame pulse generator 79, from being applied to the NOR gate 75 until a cueing pulse is also present. The NOR gate 75 may be a conventional digital circuit of the type which provides an output signal whether a signal is applied to either, but not both inputs. The edit pulses are placed in synchronism with the cueing pulses by a delay circuit 80 which provides approximately 100 microseconds delay. The remaining input terminal of the AND gate 76 is energized by the manually or automatically provided start signals through a delay circuit 81 which provides approximately 6 seconds delay. This delay constitutes a start-up interval for bringing the tape machine to full speed from the stationary condition. After this interval the edit pulses may safely be applied to the AND gate 76. The start signal is assumed to be continuously available thereafter, although a preset flp-flop comparable to flip-flop 78 may also be used.

The arrangement thus far described permits the system to be started approximately 6 seconds prior to the operation of any recording function, and then provides a signal to control the commencement of the recording function directly at the end of the previously recorded material. Whether the start sequence pulse, the manual pulse, or the automatically timed pulse is used, the signal derived selectably through the animator switch 58 immediately starts the play and record relays of the system, but does not activate the corresponding input of the AND gate 76 until after the 6 second delay provided by the delay circuit 82. The edit pulses are provided continuously to the second input of the AND gate 76 in an unbroken sequence. As long as cueing pulses are provided from the reproducing unit, however, the NOR gate 75 is held closed because the first terminal is also activated to inhibit the passage of pulses from the AND gate 76. In this respect, the 100 microsecond delay provided by the delay circuit 80 insures that there will be a proper time relationship between the edit pulse and the cueing pulses, such that there is inhibition at the NOR gate 75. The first cueing pulse after preset also activates the flip-flop 78, however, so that after the start up delay and the first cueing pulse the gated edit pulses from the AND gate 76 continually test for the existence of cueing pulses.

The gated edit pulses, however, do not pass through the NOR gate 75 until such time as the last cueing pulse pattern in the sequence previously recorded has passed the reproduce head in the system. At this instant the inhibiting signal is not present, and the gated edit pulse passes through the NOR gate 75.

The signal from the NOR gate 75 is applied directly to the On input of the RF switch 47 (FIGURE 1). Because this signal occurs in synchronism with the edit pulses, the frame sequence is not disturbed. At the same time, it is desired to begin recording a new series of cueing pulses. For this purpose, the pulses pass from the NOR gate 75, to an AND gate 83 which is conditioned by a preset flip-flop 82. The gated edit pulses therefore pass the AND gate 83 and constitute new cueing pulses suitable for recording. With the arrangement as described the first pulse from the NOR gate 75 is passed through the AND gate 83 to be recorded as a new cueing pulse, and the sequence continues unbroken until the flip-flop 82 is reset.

The cueing pulses which are recorded are also applied to a binary counter 85 which in the present example consists of four binary divider stages 86 to 89. A greater number of stages, or binary decimal stages, or other forms of counter arrangements may be employed if desired. The present arrangement, however, permits the selection of five binary-related values of numbers of frames to be recorded under control of the animator unit. The separate stages 86 to 89 of the counter 85 may consist of bistable elements such as flip-flops connected in conventional fashion. For the purpose of selection of the number of counts at which the animator unit is to terminate operation, a single pole, five position switch 90 is coupled to each of the four stages 86 to 89 of the counter 85, and also directly to the AND gate 83. The cueing pulses are applied directly to one contact of the switch (designated "1") and also to the input of the first stage 86 of the counter 85. The next contact, designated "2," is coupled to the output terminal of the first stage 86, and the remaining contacts, designated "4," "8," and "16" respectively are coupled to the succeeding stages, 87 to 89 respectively. This arrangement effectively selects, at the common terminal of the switch 90, a desired number of cueing pulses from each new cueing pulse sequence.

The selected number of pulses are used to terminate the recording of signals, and also to initiate the stop sequence. To terminate the cueing pulse sequence, the pulses directly reset the flip-flop 82 which conditions the AND gate 83. They also set another flip-flop 90, signals on the set output terminal of which control a number of functions. First, the signals concurrently activate the rewind relays and provide Off pulses to the bistable device controlling the RF switch. These signals also activate a delay circuit 92, which provides a several second delay before activating the stop control of the recording and reproducing system. Thus as soon as the stop signal is generated, the system is thrown into the high speed rewind condition, and a few seconds later, after the rewind has been carried to a point at which the system is ready for a new recording operation with a minimum amount of delay, the system is stopped, and may await a new animation sequence or some other operation.

The arrangement of FIGURE 4 illustrates the arrangement and operation of a synchronization control system 21 such as is employed in the arrangement of FIGURE 1. Studio synchronizing pulses derived from the source 22 are applied to a frame pulse generator 94, and signals derived from the timing control track during operation in the reproduce mode are each applied to a frame pulse separator 95. The frame pulse generator 94 provides a reference signal, such as a 30 pulse per second series corresponding to successive fields in the synchronizing signal. The frame pulse separator 95 extracts pulses having a like nominal repetition rate from the composite timing control signal. Each series of pulses represents pulses taken from like reference points at the start of the fields of the composite television signal. The time relationships of the two series of pulses are compared in a phase comparator 97, which generates an error signal representative of the time difference. This error signal is applicable as a coarse error control signal to the conventional capstan drive in systems of the type described. This coarse adjustment is, in sense and amount, suitable for modifying the tape speed to bring the error signal to a minimum. Thus, the timing control signals and the recorded television signals are brought into synchronous relation with the studio reference synchronizing signals. Thereafter the well-known fine error controls operate to hold the signal free from jitter and other disturbing picture effects.

Systems in accordance with the present invention will be seen to have a number of particular advantages as to the revising, editing and reviewing of television program material. Only a minimum number of switches need be set to choose and set up any of the control operations, for revising or adding to program material in particular ways. Thereafter the operation is completely electronically controlled, and entirely automatic. This means that minimum time is expended in the editing operation, and that there is no wastage of tape. Furthermore, the system is entirely compatible with existing recording and reproducing systems, and hence no modifications need be made in these systems even though the cueing unit, editor unit and animator unit become an integral part of the overall system.

Although specific forms of circuits for the control of recording and reproducing systems, and operation with recording and reproducing systems, have been described, it will be appreciated that the invention is not limited thereto. Accordingly, the invention should be considered to include all modifications and alternative forms falling within the scope of the appended claims.

What is claimed is:

1. A system for exercising supervisory control over television program material recorded on magnetic tape comprising a magnetic tape system having start and stop controls, controllable means for recording cueing signals on the tape at selected points relative to the program material, means for reproducing the cueing signals, means responsive to the reproduced cueing signals for generating start sequence and stop sequence signals, editor means responsive to start sequence and stop sequence signals and to program material for combining new program material synchronously with previously recorded material, animator means responsive to start sequence signals and to the recorded program material for adding a predetermined number of frames of new material to the previously recorded program material, and means responsive to the start sequence and stop sequence signals for selectively applying said signals to the editor means and the animator means.

2. A system for exercising supervisory control over a magnetic tape recording system to provide capability for automatically revising segments of material recorded thereon comprising means for selectively recording control signals denoting change points on the tape, means for reproducing the control signals, means responsive to the reproduced control signals for generating start and stop signals, first selectively activated means coupled to the recording system for recording new program material synchronously with previously recorded material under control of the start and stop signals, and second selectively activated means coupled to the recording system for selectively adding segments of predetermined length to the previously recorded material under control of the start signals.

3. A system for exercising supervisory control over a tape recording system comprising means for selectively recording and reproducing control signals denoting change points on the tape, recording means mounted to record on the tape, editor means operable in response to the control signals and coupled to the recording means for selectively recording new program material synchronously with previously recorded material after a selected change point, and animator means operable in response to the control signals and controlled by the editor means for selectively adding segments of predetermined length to the previously recorded material after the selected change point.

4. A system for exercising supervisory control over television program material recorded on magnetic tape to revise program material, the system comprising a magnetic tape system having start and stop controls, controllable means for recording cueing signals on the tape at selected points relative to the program material, means for reproducing the cueing signals, means responsive to the reproduced cueing signals for generating start sequence and stop sequence signals, means for recording cueing pulses denoting separate television frames, means for reproducing the cueing pulses, editor means responsive to start sequence and stop sequence signals, the reproduced cueing pulses, and to program material for combining new program material synchronously with previously recorded material, animator means responsive to start sequence signals, the cueing pulses and to the recorded program material for adding a predetermined number of frames of new material to the previously recorded program material, means responsive to the start sequence and stop sequence signals for selectively applying said signals to the editor means and the animator means to provide a selected revision of the program material, and means coupling the animator means to the means for recording cueing pulses, to add new cueing pulses as new frames are added.

5. A television signal recording and reproducing system comprising magnetic tape means for recording and reproducing the television signals, means coupled to the magnetic tape means for recording and reproducing edit signals demarcating successive television frames, an external television signal source, means for recording and reproducing control signals representative of selected change points in television program material, and control means coupled to the magnetic tape means and the external television signal source and responsive to the edit signals and the control signals for operating the magnetic tape means to substitute television signals from the external source for previously recorded signals between selected change points.

6. A television signal recording and reproducing system which selectively and controllably revises television program material comprising magnetic tape means for recording and reproducing the television signals, the magnetic tape means including means for concurrently providing edit pulses demarcating separate television frames, means coupled to the magnetic tape means for controllably recording control patterns representative of desired change points in the program material, means responsive to the control patterns for generating start sequence and stop sequence pulses during reproduction, and means responsive to the start sequence and stop sequence pulses and coupled to control the magnetic tape means to record segments of program material to revise the previously recorded television material.

7. A signal recording and reproducing system comprising a magnetic tape recording and reproducing system, first means coupled to the system for denoting successive signal segments, second means coupled to the system for recording and reproducing control signals representative of selected change points in signal segment sequences, and control means coupled to the system and responsive to the control signals and to the first and second means for operating the system to record new signal segments in predetermined relation to previously recorded signal segments the control means being coupled to the first means to denote new signal segments.

8. A magnetic tape signal recording and reproducing system which selectively and controllably revises recorded signal segments including means for controllably operating the system to start, stop and rewind the tape, means for concurrently providing edit pulses demarcating separate signal segments, switching means coupled to control the recording of signal segments, means for recording control patterns representative of desired change points in the program material, means responsive to the recorded control patterns and the cueing pulses for generating timed signal cycles, and means responsive to the timed signal cycles for controlling the switching means.

9. A system for adding to and revising television program material recorded on magnetic tape including a magnetic tape television recording and reproducing system having start and stop controls and including television signal recording tracks transverse to the tape and longitudinal tracks containing audio signals, cueing signals, and edit signals, the cueing signals denoting desired approximate change points in the program material and the edit signals denoting separate television frames, means for providing a source of program material, means for reproducing program material previously recorded on the tape controllable means for recording cueing signals on the selected longitudinal tape track at points randomly related to the program material, thereby to indicate approximate change points relative to the program material, means for reproducing the cueing signals, means responsive to the reproduced cueing signals for selectively generating start sequence and stop sequence signals, editor means responsive to the edit signals and the source of program material and coupled to the recording and reproducing system for recording program material in synchronism with previously recorded program material under the control of start sequence and stop sequence signals, animator means responsive to the source of program material and to the edit signals and coupled to the recording and reproducing system for adding a predetermined number of frames to the recorded program material under the control of start sequence signals, the animator means including means for returning the tape to a point of readiness for adding further program material in a minimum of time, and means responsive to the start sequence and stop sequence signals for selectively coupling said signals to said editor means and animator means.

10. A television signal recording and reproducing system comprising magnetic tape means for recording and reproducing the television signals, drive means coupled to control the magnetic tape means to maintain desired time base stability on reproduction of signals, means providing reference synchronizing signals, control means coupled to the magnetic tape means for operating the magnetic tape means to revise television signal sequences recorded thereon, and means responsive to the operation of the magnetic tape means during reproduction and to the reference synchronizing signals for operating the drive means to maintain synchronism between reproduced signals and the reference synchronizing signals during reproduction.

11. An intermittently operating signal recording and reproducing system which maintains synchronism between periodically recurring signal segments on the tape and an external synchronizing signal source, including the combination of controllable drive means coupled to advance the tape, means including a timing track on the tape for generating timing control signals representing actual variations in the speed of the tape, phase comparator means responsive to the timing control signals and the external synchronizing signal source for generating error signals, and means responsive to the error signals for controlling the drive means to maintain the signal segments in synchronism with the external synchronizing signal.

12. In a magnetic tape signal recording and reproducing system which is intermittently operable to revise and supplement substantially continuously disposed signal segments recorded on the tape, a control system for maintaining the recorded signal segments in synchronism with reference signals including means coupled to drive the tape at a controllable speed, means responsive to the rate of movement of the tape for providing signals representative of the signal segment rate, means for comparing the signal segment rate to the reference signals to develop an error signal, and means responsive to the error signal for controlling the means for driving the tape to maintain the signal segments in synchronism with the external synchronizing signal.

13. In a magnetic tape television signal recording and reproducing system which is intermittently operable to revise and supplement television program material recorded on the tape, a control system for maintaining recorded television frames in synchronism with studio synchronizing pulses including controllable capstan means, means for providing timing control signals representative of actual variations in the rate of the recorded television signals, phase comparator means responsive to the timing control signals and the studio synchronizing pulses for generating error signals representative of the displacement of reproduced television frame information relative to the studio synchronizing pulses, and means responsive to the error signal and coupled to the capstan means to control the capstan means to minimize the error signal.

14. A magnetic tape system for adding a selected number of frames of television program material to the end of previously recorded television program material, the television program material being recorded with cueing signals denoting each frame, the system including means providing a frequency stable vertical synchronizing reference signal, television signal recording and reproducing means including means for providing the cueing signals, means responsive to recorded cueing signals and to the vertical synchronizing reference signals for identifying the termination of a sequence of cueing signals, means responsive to the identification of the termination of the sequence of cueing signals for initiating recording at the television signal recording and reproducing means, settable counter means coupled to receive cueing signals during recording, and means coupled to the settable counter means for terminating recording at the television signal recording and reproducing means.

15. An animation control circuit for a television tape recording and reproducing system providing cueing pulses to denote successive frames, the system including means having comparing means responsive to the cueing pulses for identifying the last previously recorded frame by the absence of a cueing pulse, means responsive to the identification of the last previously recorded frame for operating the recording and reproducing system to initiate recording with frame to frame synchronism with the last previously recorded frame, means responsive to the initiation of recording for recording further cueing pulses, one for each successive frame, means responsive to the further cueing pulses for controlling the system to terminate recording at a selected number of additional frames, and means operable on the termination of recording for controlling the recording and reproducing system to return the system to a position of readiness for further recording.

16. A system for controlling a television signal recording and reproducing system to record separate sequences constituting animated program material, the television signal recording and reproducing system providing at least one record track for cueing signals denoting the start of each frame and including a source of external program material and a source of vertical synchronizing reference signals, the system comprising means for reproducing the cueing signals, means responsive to the cueing signals and the vertical synchronizing reference signals for identifying the last previously recorded frame of recorded program material, means responsive to the identification of the last recorded frame for providing a start signal for the recording and reproducing system, means responsive to the start signal for applying further cueing pulses, one for each frame, for recording by the recording and reproducing system, settable counter means coupled to receive the further cueing pulses and arranged to provide an output signal on the occurrence of a selected number of pulses, means responsive to the output signal from the settable counter means for providing a rewind signal to control the recording and reproducing system, and delay means responsive to the output signal from the settable counter means for providing a stop signal to the recording and reproducing system to terminate the rewind after a selected interval.

17. A system for controlling a television signal recording and reproducing system to record sequences of animated program material under manual control or at selected time intervals, the television signal recording and reproducing system providing at least one record track for cueing signals denoting the start of each frame and including a source of external program material and a source of vertical synchronizing reference signals, the system comprising means for reproducing the cueing signals, gating means responsive to the cueing signals and the vertical synchronizing reference signals for identifying the last previously recorded frame of recording program material, said last mentioned means being responsive to the presence of a vertical synchronizing reference signal in the absence of a cueing signal, means coupled to the gating means and the signal recording and reproducing system for initiating operation of the system at a predetermined time prior to actuation of the gating means, such that the system is brought up to normal operating speed prior to actuation of the gating means to identify the last recorded frame, switching means for controlling the recording of program material, the switching means being controllable to be turned on and off, means responsive to the identification of the last recorded frame for providing a start signal for the recording and reproducing system, the start signal being coupled to turn on the switching circuit for the program material, means responsive to the start signal for applying further cueing pulses, one for each frame, for recording to the recording and reproducing system, settable counter means coupled to receive the further cueing pulses and arranged to provide an output signal on the occurrence of a selected number of pulses, means responsive to the output signal from the settable counter means for providing a rewind signal to control the recording and reproducing system and to turn off the switching circuit, delay means responsive to the output signal from the settable counter means for providing a stop signal to the recording and reproducing system to terminate the rewind after a selected interval, and selectively operable timer means coupled to the delay means and to the recording and reproducing system for providing an initial actuating signal at predetermined intervals.

18. In a magnetic tape recording and reproducing system, for signals having repetitively timed segments initiating at predetermined points in time the combination of first means for recording and reproducing cueing pulses to denote selected change points in recorded signal segments, second means responsive to the cueing pulses for selectively generating control pulses for the tape recording and reproducing system, and third means coupled to the second means and the first means for selectively delaying the generated control pulses to effect control of different mechanisms of the tape recording and reproducing system at different times relative to a selected time segment.

19. In a magnetic tape recording and reproducing system, a system for controllably providing signals at times corresponding to selected change points in program material provided by the recording and reproducing system, including the combination of magnetic head means operatively coupled to the tape of the recording and reproducing system, means coupled to the magnetic head means for selectively generating cueing pulses, means coupled to the magnetic head means for selectively reproducing cueing pulses, triggered bistable means responsive to the reproduced cueing pulses, a pair of gating circuits, each responsive to the reproduced cueing pulses and each coupled to be controlled by a different state of the triggered bistable means to pass control pulses in response to alternate different cueing pulses, and a pair of variable delay means, each coupled to a different one of the gating means.

References Cited by the Examiner

UNITED STATES PATENTS 3,025,344 3/62 Bosustow ------------ 178—6.6

DAVID G. REDINBAUGH, *Primary Examiner.*

ROY LAKE, *Examiner.*